United States Patent [19]

Handrick et al.

[11] 4,357,450

[45] Nov. 2, 1982

[54] METHOD FOR THE PRODUCTION OF HYDROCARBON RESINS

[75] Inventors: Kurt Handrick, Essen-Steele; Georg Kölling, Essen-Bredeney, both of Fed. Rep. of Germany

[73] Assignee: Bergwerksverband GmbH, Essen, Fed. Rep. of Germany

[21] Appl. No.: 254,383

[22] Filed: Apr. 15, 1981

[30] Foreign Application Priority Data

Apr. 18, 1980 [DE] Fed. Rep. of Germany ....... 3014898

[51] Int. Cl.$^3$ ........................ C08F 2/00; C08F 110/00
[52] U.S. Cl. ...................................... 526/76; 526/290
[58] Field of Search ........................... 526/75, 76, 290

[56] References Cited

U.S. PATENT DOCUMENTS 3,040,009 6/1962 Wadsworth et al. ................. 526/76

Primary Examiner—Harry Wong, Jr.
Attorney, Agent, or Firm—Michael J. Striker

[57] ABSTRACT

In a method for the production of hydrocarbon resins based upon pyrolysates through cationic polymerization of the pyrolyzate in the presence of Friedel-Crafts catalysts and solvents at temperatures between −40° and +60° C., tetralin and/or tetralin derivatives are pyrolysed at 660°–710° C., preferably at 675°–690° C., in the presence of 1–10 mol, preferably 3–7 mol, vaporous water per mole tetralin or tetralin derivative with a dwell time of 1–2 seconds; the pyrolyzate is distilled to free it of high boiling (tarry) portions; and the unsaturated compounds contained in the distillate are polymerized in known manner. Styrene formed during the pyrolysis is preferably removed through distillation before the polymerization. The hydrocarbon mixture regenerated with the separation of the resins formed through polymerization are hydrogenated to tetralin and/or tetralin derivatives and again pyrolyzed.

6 Claims, No Drawings

METHOD FOR THE PRODUCTION OF HYDROCARBON RESINS

BACKGROUND OF THE INVENTION

The invention concerns a method for the production of hydrocarbon resins. Hydrocarbon resins are used, for example, as binding agents for printing colors, as lacquer components, as impregnation and adhering agents for paper preparation or for modification of plastic masses. For this reason, these resins should as a rule display a light color, possess a high softening point, and dissolve easily in aromatic and aliphatic solvents. Moreover, they require a good compatibility with other lacquer raw materials, terpenes and rubbers.

It is already known to produce hydrocarbon resins through cationic polymerization of aliphatic or cyclic monoor di-olefins or of aromatics, which contain a reactive double bond in the side chain or in an adjacent ring. For the cationic polymerization there will be used, in particular, the olefin mixture obtained by the cracking of crude oil (so-called C4- or C5-cuts) or higher boiling pyrolytic oils, which are rich in unsaturated, preponderantly aromatic compounds.

It is furthermore known to carry out the cationic polymerization in the presence of Friedel-Crafts catalysts, for example $AlCl_3$, $SnCl_4$ or $BF_3$, which have been activated through addition of an acid, an alcohol or an ether. If the mixture that is to be polymerized displays a high content of unsaturated compounds, the polymerization will be carried out in the presence of an inert solvent, for example toluene or xylene, chlorbenzene or methylene chloride. The temperature for the polymerization in general lies between $-40°$ and $+60°$ C., preferably between $-20°$ and $+40°$ C.

It is moreover known (see Fuel 1979, vol. 58, pages 211-214) that with the pyrolysis of tetralin, in addition to small amounts of 2-methyl-indene, mainly styrene, indene and 1,2-dihydronaphthalene are formed. Herewith the pyrolysis will be accomplished above $725°$ C. in the presence of nitrogen as carrier gas. For optimal progress the cracking reaction should first take place, however, between $750°$ and $850°$ C. At $775°$ C. and a contact time of 0.5 seconds the reaction mixture contains for example 3.0% styrene, 5.0% indene, as well as 24.6% 1,2-dihydronaphthalene.

SUMMARY OF THE INVENTION

The invention is based upon the problem of obtaining with the pyrolysis of tetralin and/or tetralin derivatives under essentially mild conditions a high portion of unsaturated compounds, and with the subsequent polymerization, qualitatively high value resins at higher yields.

It is indeed surprising that at temperatures below $700°$ C., at which until now no splitting of tetralin was known, already considerable portions of resinifiable pyrolysis products are formed. Their total amount exceeds even that which is obtained with the high temperature of $775°$ C. and thereupon with known methods—as mentioned above. Carbon will not be separated in the reactor space. The distillation residue of the pyrolysis products—high-boiling (tarry) portion—amounts to only about 1% by weight; the distillate is almost colorless and results in a light resin with the polymerization. It is moreover surprising that the 1,2-dihydronaphthalene or its analog formed as main pyrolysis products therefrom is cationically polymerizable.

The pyrolysis reactor is preferably filled with an inert material, for example quartz fragments; the actual reaction zones (main reaction zones) are coordinated into a pre- and a post-reaction zone, which are adjusted at times to a lower temperature than the reaction temperature ($660°-710°$ C.).

When one works in contrast according to the already mentioned known methods, not only does the resin yield comparatively drop, but it impairs also the quality of the resins. It has turned out, namely, that with an increase in the throughput (dwell time of 0.5 seconds) and with known methods at a temperature of $775°$ C., a strongly darkly colored pyrolysate will be obtained. In addition, carbon is separated in the reactor space. Through a distillation, in which more than 5% by weight of tarry distillation residues are left, the distillate remains still more strongly colored, so that with the polymerization a resin with an inferior dye number results.

It was moreover discovered that besides tetralin also substituted tetralin (i.e. tetralin derivatives) or mixtures of both can be yielded by pyrolysis. These mixtures can additionally contain still other partially hydrogenated aromatics, such as indan or methylindan. As raw material for the tetralin derivatives there are suited also the, for example, naphthalene or methylnaphthalene sections falling out from the working up of petroleum or coal tar, which, eventually after desulfurization with nickel catalysts, will be hydrogenated into tetralin substances. An additional raw material for the tetralin derivatives is the medium oil falling out from the hydrogenation of bituminous coal, which contains in the boiling range of $200°-280°$ C. large portions of naphthalene, methyl- and dimethylnaphthalene along with other aromatic compounds. A portion of the naphthalene is present already as tetralin or tetralin derivative. This distillation section, after one has beforehand removed the phenols and bases from it, will be after-hydrogenated and, following that, pyrolysed.

After the pyrolysis, the pyrolysate will be distilled for removal of possibly formed tarry (high boiling) portions. Herewith it is advantageous to remove, according to an additional improvement in the invention, the main portion of the styrenes formed in the pyrolysis before the polymerization. This can take place with the distillation of the pyrolysate through separation of the first runnings. Styrene tends to form polymerisates with higher molecular weight, which are no longer completely soluble in solvents. A good solubility will, however, be furthered by the hydrocarbon resins. carbon resins.

The distillate of the pyrolysis products, expeditiously after addition of a solvent such as e.g. toluene, in the presence of a Friedel-Crafts catalyst in known manner, will be subjected to the resinification.

Following that, the formed resin, as is generally customary, will be prepared through a steam distillation. The herewith with the steam volatile hydrocarbon mixture will, according to the invention, again be hydrogenated to tetralin and/or tetralin derivatives and anew be subjected to the pyrolysis. In this manner the portion that has been transformed into naphthalene or naphthalene derivatives by the pyrolysis will again be brought to a transformation into hydrocarbon resins. The molecular weight of the resins produced according to the invention lies somewhere in the range of 700-1000.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

The cylindrical reactor used for the pyrolysis had a length of 1 meter and a width in the clear of 4 cm. It was filled to about 50% with irregularly broken fragments of quartz glass. The upper fourth of the reactor was heated by means of an electrical heating to a temperature of 500° C.; the following reaction zone (50 cm) to a temperature of 685° C. and the lower fourth to a temperature of 600° C. From the top, under exclusion of nitrogen, 198 g tetralin (1.5 mol) and 180 g $H_2O$ (10 mol) in the form of steam were provided every hour. The dwell time of the reaction participants in the reaction zone amounted therewith to about 1.4 s. The vapor leaving the reactor was extensively condensed, whereby the non-condensed portion was composed essentially of hydrogen, methane and ethylene. Following that the water was separated from the condensate and the residual part (organic phase=pyrolysate) was distilled without interposition of a column. Per kg of pyrolysate, a tarry residue of 13 g, i.e. 1.3% by weight, was left behind. The distillate was composed of, according to gas chromatographical analysis, 6.4% styrene, 11.5% indene, 23.5% 1,2-dihydronaphthalene, 2.2% methylindene, 26.0% naphthalene and 28.2% tetralin; the remainder was divided among small amounts of benzene, toluene and ethyl benzene. In an after-connected distillation column the styrene was distilled off, whereby also the residual traces of water were removed. Following this, the styrene-freed pyrolysate was thinned with the same amount of toluene. The resinification was carried out in a vessel provided with stirrer, which was loaded with nitrogen. It took place under gradual addition of about 3% by weight of boron trifluoride-diethyl either as catalyst, referring to the content of monomer, whereby the temperature was kept at 10° C.

With a subsequent customary steam distillation, a nearly colorless resin remained behind in a yield of 35% by weight, relative to the pyrolysate (correspondingly 94%, relative to the above mentioned resinifiable portion, namely indene, 1,2-dihydronaphthalene and methylindene). The resin displayed a softening point of 106°–107° C. (according to Kraemer-Sarnow). It was completely soluble in cold toluene.

EXAMPLE 2

Middle oil from bituminous coal hydrogenation was initially freed of phenolic and basic portions. With the subsequent distillation the fraction that came out in the temperature interval of 205°–275° C., enriched in naphthalene, methyl- and dimethylnaphthalene as well as the corresponding tetralins, was separated. It displayed a sulfur content of 35 ppm and was after-hydrogenated on a nickel-carrying catalyst (Harshaw Ni-1404 P) at 150° C. and a hydrogen pressure of 30 bar until no more hydrogen absorption took place.

The product was—as described in Example 1—subjected to the pyrolysis. After separation of the water and careful drying, the pyrolysate was quickly distilled under addition of metallic sodium (0.5% by weight). The tarry distillation residue amounted to 2.4% by weight. The mildly yellow colored distillate contained, according to gas chromatography determination, only a very small portion of styrene and could be used directly for polymerization. This was accomplished according to Example 1. The yield of resin amounted to 39% by weight, relative to the distillate amount used (from the distillation of the pyrolysate). The amber-colored resin had a softening point of 114°–115° C. and was clearly soluble in toluene.

It will be understood that each of the elements described above, or two or more together, may also find a useful application in other types of polymerizations differing from the types described above.

While the invention has been illustrated and described as embodied in a method for the production of hydrocarbon resins, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method for the production of hydrocarbon resins based upon pyrolysates through cationic polymerization of the pyrolysates in the presence of Friedel-Crafts catalysts and solvents at temperatures between $-40°$ and $+60°$ C., comprising the steps of pyrolysing tetralin, methyl-tetralin and/or dimethyl-tetralin at 660°–710° C. in the presence of 1–10 mol vaporous water per mol tetralin or tetralin derivative with a dwell time of 1–2 seconds; distilling the pyrolysate for freeing of high boiling portions; and polymerizing the unsaturated compounds contained in the distillate.

2. Method according to claim 1, wherein said step of pyrolysing is performed at 675°–690° C., in the presence of 3–7 mol vaporous water per mol tetralin, methyl tetralin or dimethyl-tetralin.

3. Method according to claim 1, further comprising the step of removing the styrene formed during said step of pyrolysing before said step of polymerizing, through distillation.

4. Method according to claim 1, further comprising the steps of removing resins formed through said step of polymerizing, hydrogenating the hydrocarbon mixture left after removing the resins formed through polymerizing into tetralin, methyl-tetralin and/or dimethyl-tetralin; and then repeating said step of pyrolysing.

5. Method according to claim 1, wherein said solvents are selected from the group consisting of toluene, xylene, chlorbenzene and methylene chloride.

6. Method according to claim 1, wherein said Friedel-Crafts catalysts are selected from the group consisting of $AlCl_3$, $SnCl_4$ and $BF_3$, which have been activated through the addition of an acid, an alcohol or an ether.

* * * * *